Sept. 16, 1969   C. R. PEPMEIER   3,467,331
FILM UNWINDING METHOD AND APPARATUS
Filed Nov. 8, 1967

United States Patent Office 3,467,331
Patented Sept. 16, 1969

3,467,331
FILM UNWINDING METHOD AND APPARATUS
Carl R. Pepmeier, Fredericksburg, Va., assignor to FMC Corporation, Philadelphia, Pa., a corporation of Delaware
Filed Nov. 8, 1967, Ser. No. 681,378
Int. Cl. B65h 75/02, 17/20
U.S. Cl. 242—55                 7 Claims

ABSTRACT OF THE DISCLOSURE

Method and apparatus for unwinding a continuous film from a supply roll in which a portion of the unwound film is vibrated to break the cohesive bond between overlying layers of film on the supply roll.

---

Figure 2:
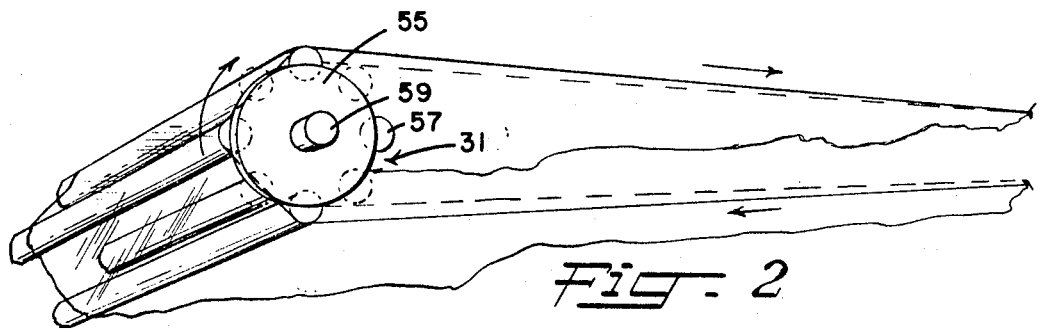

The present invention is directed to a method and apparatus for unwinding a continuous film, and particularly a film which has a tendency to cling to itself, from a supply roll.

In many wrapping machines presently in use the wrapping material itself is supplied in the form of a roll from which necessary lengths are withdrawn and severed, as for example, for manual wrapping of an article. Generally, in such known machines the supply roll of wrapping material is positively rotated at a constant rate of speed to assist in unwinding and with materials, such as paper or cellophane film, no significant problems are encountered during the unwinding thereof. There are, however, certain other wrapping materials, such as polyvinyl chloride film, which have a tendency to cohere or cling to themselves, especially when wound in roll form.

While this clinging characteristic of such films is often advantageous during actual wrapping of an article, it serves also to prevent overlying layers of a film roll from being easily separated from each other. For example, when once laced through conventional wrapping machines, it has been found that further unwinding of such film is, at most, erratic even when the film supply rod is itself rotated to assist in the removal of film therefrom. In many instances, and especially with polyvinyl chloride film, the coherence between overlying layers of the film supply roll is such as to cause an unwound portion of the film to rewind itself upon the rotating supply roll. Accordingly, a primary object of this invention is to provide a generally new and improved and more satisfactory method and apparatus for unwinding a continuous film from a supply roll.

Another object is the provision of a method and apparatus for separating overlying layers of a continuous film of a film supply roll during the unwinding thereof.

Still another object is to provide a method and apparatus for breaking the clinging or cohesive bond between overlying windings of a continuous film of a film supply roll during the unwinding thereof.

A further object is the provision of an improved method and apparatus for unwinding a continuous film from a supply roll without marring or otherwise damaging the film surface characteristics.

A still further object is to provide an apparatus for unwinding a continuous film from a supply roll which is simple in construction and operation, and is adapted for use with conventional article wrapping machines.

These and other objects are accomplished in the present invention by a method and apparatus in which a continuous film, which has a tendency to cling to itself, is vibrated or caused to flutter as it is being unwound to break the cohesive bond between overlying film layers of a supply roll. More particularly, a portion of the film withdrawn and extending to the supply roll is vibrated, while under tension, in a direction generally perpendicular to its longitudinal axis concomitantly with its advancement to thereby break the cohesive bond between film layers at the area at which such film is withdrawn from the supply roll. In the method of the present invention, as in conventional unwinding procedures, the film supply roll is positively rotated in a direction which will assist in the unwinding of film therefrom.

A preferred form of apparatus of the present invention for vibrating or fluttering the unwound portion of the film includes a roller having an interrupted or discontinuous peripheral surface which is adapted to be engaged with the advancing film. More particularly, the roller of the present invention includes a pair of end plates between which extend a series of circumferentially spaced rods. The greater the number of rods employed in the roller construction the less becomes the magnitude of vibration imparted to the film which is engaged therewith. Generally, at least two or perhaps three or four of such rods are necessary for satisfactory operation.

The rods of the film vibrating roller preferably have a smooth surface and are formed of material which will not scratch or otherwise mar the surface characteristics of the film which is engaged therewith. A vibrating roller having four equally spaced rods formed of hardwood, and particularly maple, have been found to be satisfactory when employed in unwinding of polyvinyl chloride film.

During use, the film vibrating roller of the present invention is positively driven in the same direction and at least at the same rate of speed as the film supply roll. Preferably, the film vibrating roller is driven at a faster speed, as for example 10% to 30%, faster than the film supply roll to tension the unwound portion of the film extending from the supply roll and thereby receive maximum effect of the vibration imparted thereto.

While the method and apparatus of the present invention may be employed in any application which involves unwinding a film from a roll, as for example in film rewinding operations, it is hereafter described as incorporated into a conventional article wrapping machine.

Figure 1:
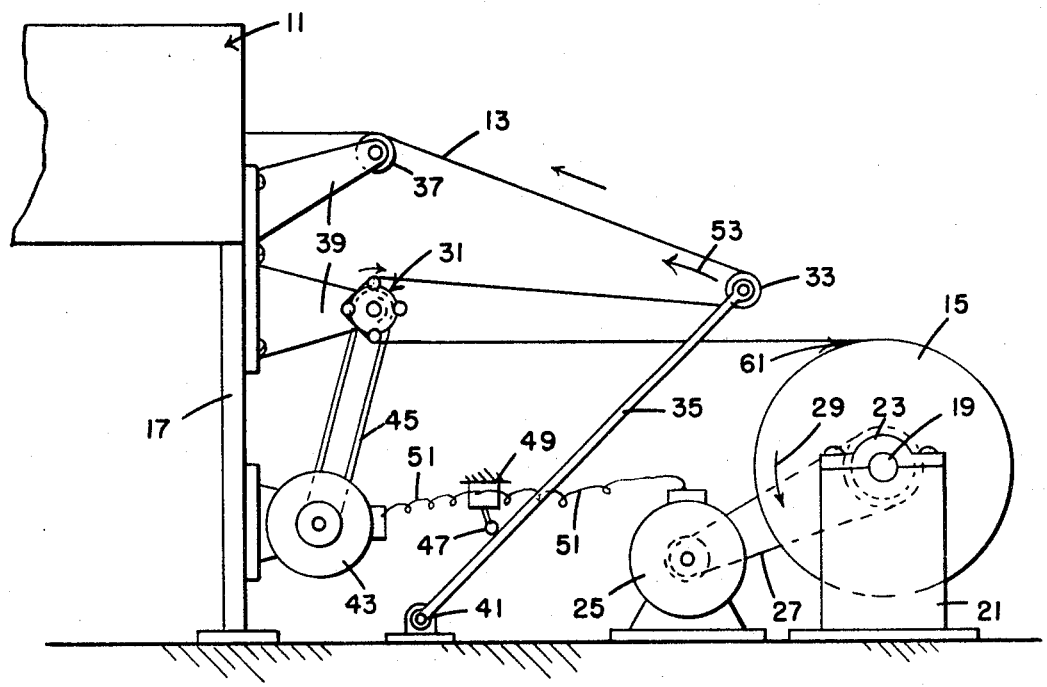

For a greater understanding of this invention, reference is made to the following detailed description and drawing in which FIGURE 1 is a diagrammatic side view of a portion of an article wrapping machine in which the apparatus of the present invention is incorporated; and FIGURE 2 is a perspective view of a portion of the machine shown in FIGURE 1, and particularly the film vibrating roll of the present invention.

With reference to FIGURE 1 of the drawing, character 11 designates a conventional article wrapping machine into which a continuous film 13 is delivered from a film supply roll 15. The wrapping machine is carried by supports 17 and may be of any conventional construction, as for example, one into which film is fed intermittently, as determined by an operator, for manual wrapping operations. The film 13 may also be of any type and for purposes of description, is a commercially available polyvinyl chloride film which exhibits a tendency to cohere or cling to itself and thus is difficult to separate from a supply roll during the unwinding thereof.

The film supply roll 15 includes a core and is fixed to a shaft 19 which is rotatably carried by suitable end supports 21. A sprocket 23 is fixed to the shaft 19 and is driven by a motor 25 through an endless chain 27 to thereby rotate the film supply roll 15 in a direction as indicated by arrow 29.

The leading end of the continuous film 13 which is withdrawn from the supply roll 15 is laced about a film vibrating roller 31, extends around a roll 33 on a tension arm 35, contacts with an idler roll 37 and then passes into the wrapping machine itself. The film vibrating roller 31 and the idler roller 37 are rotatably supported from the supports 17 and machine 11, respectively, by suitable brackets 39, while the tension arm 35 is pivoted at 41 for swinging movement.

The film vibrating roller 31 is positively driven by a motor 43 through an endless chain 45 which is laced over suitable sprockets. A switch 47 is fixed at 49 in the path of the swinging tension arm 35 and is electrically connected by wires 51 to both of the motors 25 and 43. Upon application of tension to the film 13, as by an operator pulling upon the film, the tension arm 35 is swung in the direction of arrow 53 until the switch 47 is tripped and sets both motors 25 and 43 in operation. As more fully described hereafter, the motor 43 drives the roller 31 at least at the same speed and preferably at a greater speed than the film supply roll.

As illustrated in FIGURE 2, the preferred construction of the film vibrating roller 31 includes a pair of end plates 55 between which extend a series of circumferentially spaced rods 57. A center pins 59 projects from each end plate 55 and are received in support brackets 39. The rods 57 have smooth surfaces and are formed of materials, such as wood which will not damage the film surface characteristics.

In use, the film 13 is initially laced along a path as illustrated in FIGURE 1 and, with the tension bar 35 being spaced from the switch 47, both motors 25 and 43 are inoperative. As the operator of the wrapping machine 11 pulls upon the film 13, the tension arm 35 is swung in the direction of the arrow 53 until it trips the switch 47 and starts both motors 25 and 43.

As heretofore mentioned, the motor 43 rotates the film vibrating roller 31 at a faster rate of speed than the film supply roller 15 so that the portion of the film withdrawn from and extended to the supply roll is tensioned. The roller 31 will, of course, rotate relative to the film 13 and, as a result of the interrupted surface formed by the rods 57, causes the film to vibrate, as illustrated in FIGURE 2, in a direction generally perpendicular to its longitudinal axis. This film vibration or flutter serves to break the cohesive bond in the area, indicated at 61, to thereby separate overlying film layers of the film supply roll 15.

I claim:
1. A method for unwinding from a supply roll a continuous film which has a tendency to cling to itself including the steps of withdrawing the leading end of the continuous film from the supply roll, positively rotating the film supply roll in the direction of film withdrawal, maintaining tension on a portion of the film withdrawn from and extending to the supply roll, and vibrating such tensioned film portion in a direction generally perpendicular to its longitudinal axis while concomitantly advancing the film away from the supply roll to thereby break the cohesive bond between overlying film layers at the area at which such film is withdrawn from the supply roll.

2. A method as defined in claim 1 wherein the tensioned film portion is vibrated by passing the same over a driven roller having an interrupted peripheral surface.

3. A method as defined in claim 2 wherein the portion of the film withdrawn from and extending to the supply roll is tensioned by rotating the roller at a faster rate of speed than the film supply roll.

4. Apparatus for unwinding from a supply roll a continuous film which has a tendency to cling to itself including means for positively rotating the supply roll in a direction opposite to the direction of film windings thereon and means for tensioning and concomitantly vibrating a portion of the film withdrawn from and extending to the film supply roll to break the cohesive bond between overlying film layers at the area at which such film is withdrawn from the supply roll.

5. Apparatus as defined in claim 4 wherein said film tensioning and vibrating means includes a roller positioned in spaced relationship with the film supply roll and adapted to engage with the film withdrawn from the supply roll, said roller having an interrupted peripheral surface, and means for rotating said roller in the same direction and at a faster rate of speed than the film supply roll.

6. Appratus as defined in claim 5 wherein said roller includes a pair of longitudinally spaced end plates and a series of circumferentially spaced rods extending between said end plates.

7. Apparatus as defined in claim 6 wherein said rods have smooth surfaces and are formed of wood.

References Cited
UNITED STATES PATENTS

| | | | |
|---|---|---|---|
| 2,647,746 | 8/1953 | Krueger | 226—96 |
| 2,650,037 | 8/1963 | Judelson | 242—67.3 |

WILLIAM S. BURDEN, Primary Examiner

U.S. Cl. X.L.
226—193